United States Patent [19]
Ketola

[11] Patent Number: 6,112,099
[45] Date of Patent: *Aug. 29, 2000

[54] TERMINAL DEVICE FOR USING TELECOMMUNICATION SERVICES

[75] Inventor: Pekka Ketola, Tampere, Finland

[73] Assignee: Nokia Mobile Phones, Ltd., Espoo, Finland

[*] Notice: This patent issued on a continued prosecution application filed under 37 CFR 1.53(d), and is subject to the twenty year patent term provisions of 35 U.S.C. 154(a)(2).

[21] Appl. No.: 08/787,864

[22] Filed: Jan. 23, 1997

[30] Foreign Application Priority Data

Feb. 26, 1996 [FI] Finland ..................... 960894

[51] Int. Cl.$^7$ .................................. H04Q 7/20
[52] U.S. Cl. ................. 455/466; 370/252; 370/338
[58] Field of Search ................... 455/524, 556, 455/566, 466, 67.1, 38.3, 517, 551, 557, 574, 403; 379/93.18, 89; 370/218, 299, 912, 913, 338, 349, 428, 252

[56] References Cited

U.S. PATENT DOCUMENTS

| | | | |
|---|---|---|---|
| 4,527,267 | 7/1985 | Cohen | 370/428 |
| 4,759,014 | 7/1988 | Decker et al. | 370/503 |
| 4,837,800 | 6/1989 | Freeburg et al. | 455/557 |
| 4,914,650 | 4/1990 | Sriram | 370/528 |
| 5,146,454 | 9/1992 | Courtois et al. | 370/252 |
| 5,220,501 | 6/1993 | Lawlor et al. | 380/24 |
| 5,371,734 | 12/1994 | Fischer | 340/825.47 |
| 5,404,392 | 4/1995 | Miller et al. | 455/466 |
| 5,422,656 | 6/1995 | Allard et al. | 345/173 |
| 5,509,050 | 4/1996 | Berland | 455/557 |
| 5,627,878 | 5/1997 | Strauch et al. | 455/466 |
| 5,907,555 | 5/1999 | Raith | 455/422 |

FOREIGN PATENT DOCUMENTS

| | | |
|---|---|---|
| 0 605 349 A2 | 7/1994 | European Pat. Off. . |
| 0 666 681 A2 | 8/1995 | European Pat. Off. . |
| 0 695 075 A1 | 1/1996 | European Pat. Off. . |
| WO 93/07684 | 4/1993 | WIPO . |
| WO 94/12938 | 6/1994 | WIPO . |

*Primary Examiner*—Dwayne D. Bost
*Assistant Examiner*—Jean A Gelin
*Attorney, Agent, or Firm*—Perman & Green, LLP

[57] ABSTRACT

The terminal device according to the invention provides means for connecting said terminal device with telecommunication network for utilizing data based services and means for offering information processing services, such as display (15) and means for data input (15, 16, 17). The user utilizes data processing services, e.g. WWW browser prior known from Internet, without a mouse or any corresponding pointing device. In the terminal device according to the invention the data connection with the telecommunication network is closed in order to save current and cost, when data transfer is not needed. The closing of the data connection is optimized between service speed and current saving. In the terminal device according to the invention the user interface and the use of WWW services are functionally divided into several logical levels.

13 Claims, 9 Drawing Sheets

TERMINAL DEVICE FOR USING TELECOMMUNICATION SERVICES

FIELD OF THE INVENTION

The present invention relates to a terminal device for connection with telecommunication network, by means of which the user utilizes telecommunication services and which terminal device disconnects the connection to the telecommunication network when a certain predetermined criterion is met.

BACKGROUND OF THE INVENTION

In the modern information society people are more and more dependent on telecommunication networks and the services offered by them. Utilizing telecommunication networks has been experienced to be so important that people no more want to be dependent on the bonds of traditional wired network. That is why a great number of people already have wireless mobile stations, e.g. GSM mobile phones which are mainly used for normal speech communication.

To a more increasing extent people have become dependent on also other telecommunication services available, such as telefax, electronic mail, Internet and other information transfer services. An important service is the WWW pages offered by Internet, and the versatile services utilized through them. When one is used to these services in the traditional office environment, they are difficult to give up for example when leaving for a business trip.

In order to be able to manage easily, when on the road, for example, one's time and meetings, so called electronic notebooks have been developed. They are generally called PDA (Personal Digital Assistant) devices. These devices are also called PCD (Personal Communication Device) and PIC (Personal Intelligent Communicator). These devices are typically of the size of a largish pocket calculator and often equipped with a touch display. The user can with a plastic tip pencil, designed particularly for this purpose or even by touching the display with fingers, write text and figures on the display, from which the device interprets the information given. Typical services made possible by PDA devices are e.g. calendar and notebook services, reminding of agreed meetings by e.g. an acoustic signal and a phone book, from which information can be searched based upon a person's or company's name or other corresponding information. Additionally, PDA devices often also have a pocket calculator function.

When the features of a mobile station, a computer and a typical PDA device are integrated and packed in a very compact size, the result is a very versatile wireless telecommunication terminal. An example of a device that has a touch display known from PDA devices, DOS operating system known from computers and a traditional mobile station is presented in patent publication U.S. Pat. No. 5,422,656.

Telecommunication terminals according to above are however, such as they are, poorly adapted for utilizing Internet services, and in particular for utilizing services used through graphic WWW pages. The display is small, only a limited number of keys is available and using a mouse as a pointer is not practical. Programs prior known from computers utilizing the Internet also draw plenty of current, because the data connection is kept open even if no data is transmitted.

SUMMARY OF THE INVENTION

Now a terminal device has been invented, which offers its user a multi-level user interface, through which, in spite of the limitations set by the size of the user interface, the terminal device is particularly suitable for effective wireless utilization of the Internet Services, and which terminal device disconnects the connection to the telecommunication network when it is no longer needed. In this way current saving is achieved and the operating time of the terminal is increased.

In order to optimize current saving and various functions, in the terminal device for wireless connection to telecommunication network according to the invention, the functions necessary for utilizing telecommunication services are preferably divided in at least two logical levels, of which levels each executes the tasks allocated to it as effectively as possible. In this context efficiency means, depending on the service and the various situations of use, e.g. fast operation of the service, easiness of use and minimizing the time for information transfer by radio. Remarkable savings are achieved in both current consumption, which is of prime importance for a battery operated wireless terminal device, and in phone bills. In order not to open the data channel unnecessarily, information is retrieved from memory whenever it is possible.

The terminal device according to the invention is characterized in, that it provides means for disconnecting the data connection to the telecommunication network when a predetermined criterion representing a quantity is met.

There are several embodiments, different in their mechanical approach, for the terminal device according to the invention utilizing a multi-level user interface. The multi-level user interface is particularly suitable for mobile stations, in which, by enhancing the display and keyboard of a conventional mobile station and/or by replacing the conventional LCD display with a touch sensitive "touch screen" display, it is possible to provide a user interface sufficiently large for utilizing versatile telecommunication services. The above described embodiment is suitable, unless very large volumes of information need processing, in which case the small size of display and/or keyboard set their limitations.

The terminal device according to the invention utilizing multi-level user interface is described in detail in the following, using two preferable embodiments, of which the first one is for its mechanical solutions clearly distinguishable from conventional mobile stations. Nothing however prevents from using the multi-level user interface according to the invention in devices bearing greater resemblance with conventional mobile stations for their mechanical construction, such as illustrated by the second embodiment presented. Said first embodiment makes it possible to use a larger display and a larger keyboard without increasing the dimensions of the terminal device.

DETAILED DESCRIPTION

Figure 1:
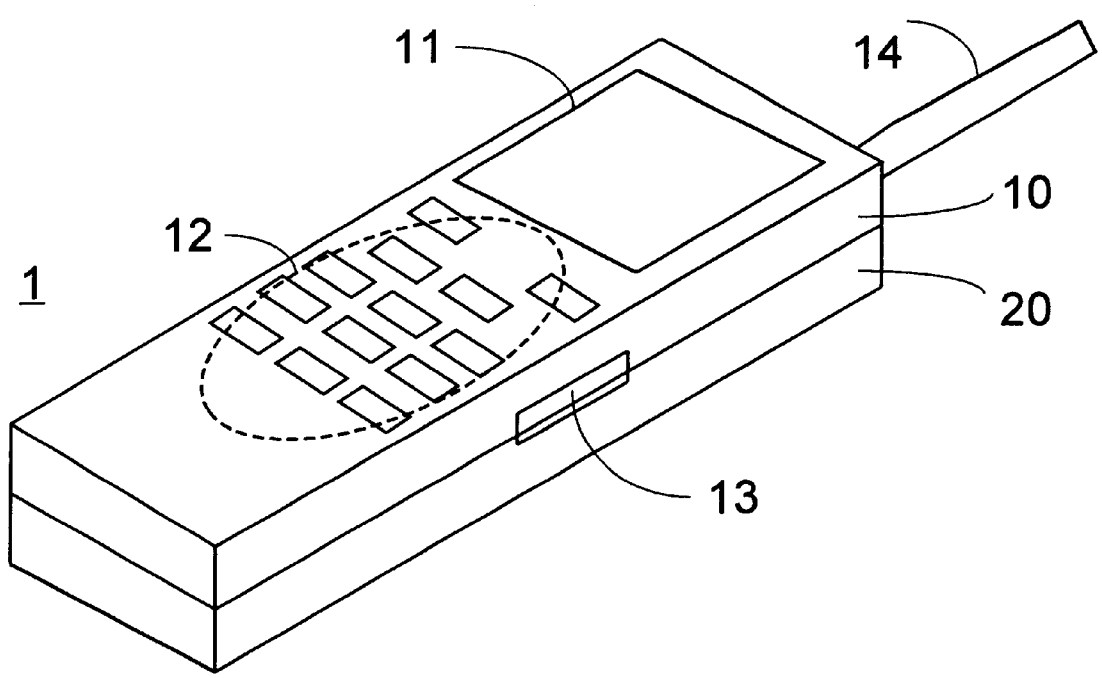
FIG. 1 presents a first embodiment of the terminal device according to the invention employing a multi-level user interface with its cover closed (mobile telephone position)
Figure 2:
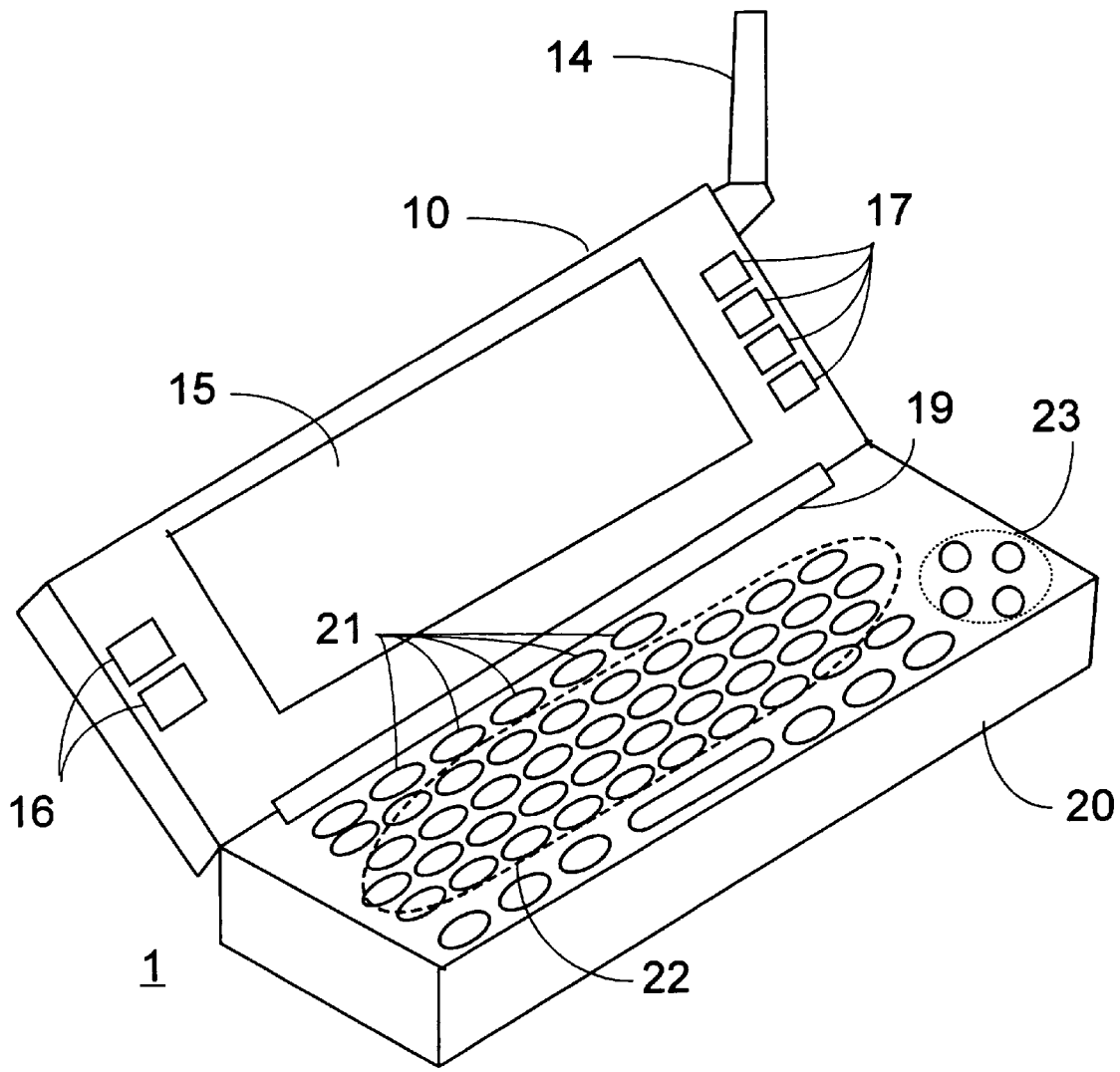
FIG. 2 presents a first embodiment of the terminal device according to the invention employing a multi-level user interface with its cover open (terminal device position)

FIGS. 1 and 2 present a first embodiment of terminal device 1 employing a multilevel user interface according to the invention. In the first embodiment terminal device 1 is a multi service mobile station with two sections. The multi service mobile station can be used in two positions, of which the first one presented in FIG. 1, the mobile telephone position is optimized for using the terminal device primarily like a conventional mobile station. The second position, terminal device position presented in FIG. 2, on its behalf has been optimized for using the terminal device as a versatile telecommunication terminal. Particularly in this second position, the multilevel user interface according to the invention is utilized for using telecommunication services.

Terminal device 1 according to the invention is presented in FIG. 1 in the mobile telephone position with cover section 10 and base section 20 folded together and supported by hinge 19 (FIG. 2). In FIG. 1, the top side of cover section 10 comprises display 11 for presentation of alphanumeric characters or graphic figures, and keyboard 12 for inputting alphanumeric characters in terminal device 1. When terminal device 1 is in mobile telephone position, cover section 10 and base section 20 are locked together with latch 13. In the first embodiment according to the invention folding antenna 14 is mounted in cover section 10.

In FIG. 2 the first embodiment of terminal device 1 according to the invention is presented in terminal position, in which cover section 10 and base section 20 are unfolded apart from each other supported by hinge 19. In this position the inside of cover section 10 and the top side of base section 20 provide the user with a user interface comprising display 15, scroll keys 16 and function keys 17, and base section 20 comprises application keys 21, QWERTY keys 22 prior known from typewriters and computers, and arrow keys 23. If needed, displays 11, 15 can be provided with "touch screens" enabling also inputting information in terminal device 1 using a specific pencil or by touching with fingers.

Figure 3:
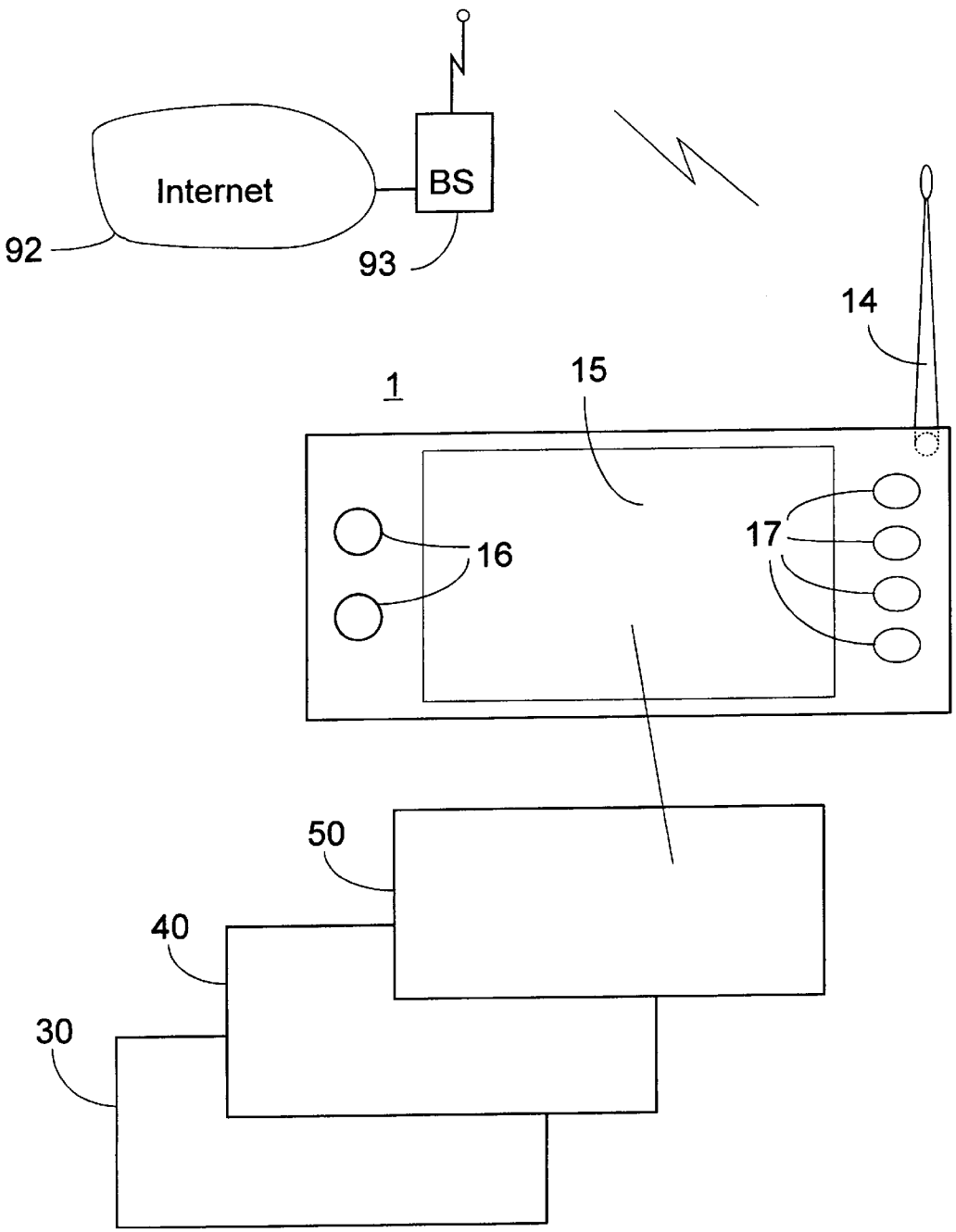
FIG. 3 presents a second embodiment of the terminal device according to the invention employing a multi-level user interface.
Figure 4:
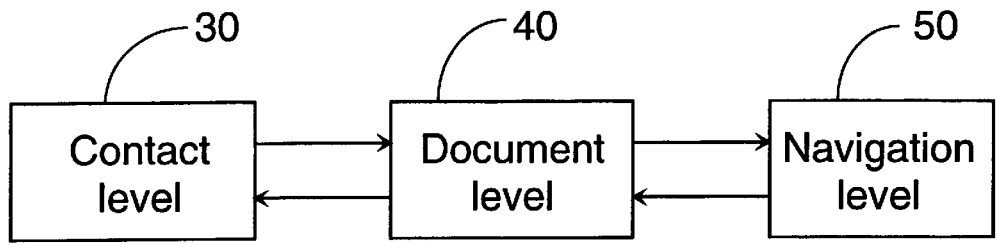
FIG. 4 presents the user interface levels of a WWW browser employing a three-level user interface according to the invention and the logical dependence on each other of the user interface levels.

FIG. 3 presents a second embodiment of terminal device 1 employing the multi-level user interface according to the invention. The user interface of terminal device 1 equally comprises display 15, scroll keys 16 and function keys 17. Also a folding antenna is shown in FIG. 3. In this second embodiment the user interface as a whole is much simpler than in the first embodiment, but as to its functions the multi level user interface according to the invention is used like in the first embodiment. In the following the multi level user interface is described using as an example mainly the first embodiment described in FIGS. 1 and 2.

Terminal device 1 utilizing the multi level user interface according to the invention offers, in addition to speech and data services prior known from conventional mobile stations, several additional functions, such as e.g. sending and receiving telefax and electronic mail messages, a possibility to contact Internet, to use terminal device 1 as an electronic notebook or even utilizing special services provided by telecommunication network, such as call forwarding or group call services. Through WWW (World Wide Web) pages known from Internet environment, using also new, still developing services, e.g. weather and betting services is easily accomplished.

When the user wishes to activate e.g. a service employing WWW (World Wide Web) pages, this is done e.g. by pressing the corresponding menu key 21, after which the service utilizing WWW pages appears on the user interface display 15 (FIG. 2). The WWW service provides the user with information through display 15, and the user inputs information to the WWW service mainly using scroll keys 16 and function keys 17, but, if needed, also with QWERTY keys 22.

By using the multi level user interface according to the invention, it is possible, using only scroll keys 16 and function keys 17, to utilize the versatile WWW services, the utilization of which has typically required a considerably larger number of keys. In this way it is possible to utilize WWW services using terminal device 1 employing the simple user interface 15, 16, 17 described in FIG. 3. Terminal device 1 can, differently from the above described multi service mobile station, be designed to provide only the WWW service known from Internet. Terminal device 1 need not necessarily comprise a radio transmitter and receiver, but terminal device 1 can possibly be designed to be connected to the telecommunication network through conventional telephone network or even through the ISDN (Integrated Service Digital Network).

Because display 15 used for e.g. browsing WWW cannot be very large because of the size requirements on the terminal device according to the invention, the same versatile possibilities are not available for the WWW browser, which are available when using monitors known from personal computers. Display 15 cannot at one time accommodate all data and menus needed e.g. for selecting WWW links, saving documents, navigating in Internet and updating the scroll list comprising link address data. In a typical WWW browser, such as Netscape program used in Windows environment, all necessary information can be displayed in a large monitor at one time, in which case all functions necessary for using a service can be carried out at one time and on same logical level. Additionally, e.g. selecting links by double-clicking the mouse is possible, differently from terminal device 1 according to the invention, in which normally only keys and/or touch screen are available.

In principle, it is possible in terminal device 1 according to the invention to use e.g. a pointer ball, prior known from portable computers or other corresponding pointing device, but this kind of equipment is bulky, expensive to realize and sensitive to soiling and wear. The multi-level browser of terminal device 1 according to the invention removes these problems, because using it the user can browse WWW pages, and utilizing links, surf in Internet using just scroll keys 16 and function keys 17. From ergonomical point of view it is particularly preferable that the user need not move his hands while using the multi-level WWW browser, but can execute all functions just by moving his thumbs. Subsequently, using the device is stable and firm, and not even prolonged use will tire the user. Using is also possible when on the move, e.g. while walking.

In the following the multi-level user interface is described using the three-level WWW browser as an example. The fact that the three-level WWW browser is used as an example does not limit using the multi-level user interface according to the invention for offering also other services than WWW services. The number of user interface levels can also be two, or more than three.

Figure 5:
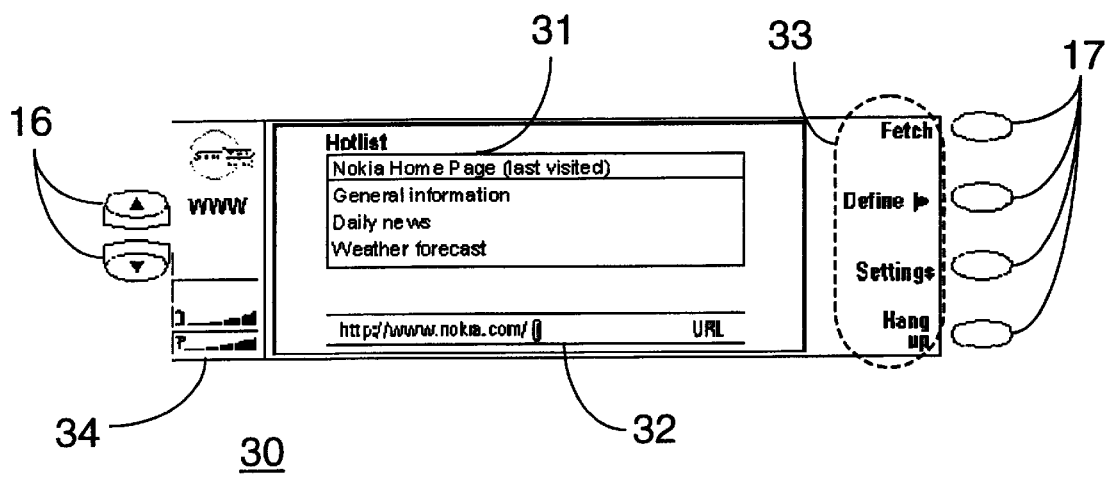
FIG. 5 presents the first interface of a WWW browser employing a three-level user interface according to the invention, the contact level.

In the terminal device according to the invention employing a three level user interface the functions necessary for the realization of the WWW browser are in the example divided into three logic levels, contact level 30, document level 40 and navigation level 50 (FIG. 5). Each logical level comprises the functions most needed by the user. This aims at having all necessary services available using just few scroll keys 16 and function keys 17. When the user moves to an entirely new user situation, e.g. from scrolling a WWW page to searching for a new WWW page through Internet, he moves to another logical user level. Different logical user levels have different requirements, and accordingly by correct design of memory 96 and the data channel, each level works effectively and the data channel can always be closed when it is not needed. The following is a detailed description of the different user levels.

Figure 11:
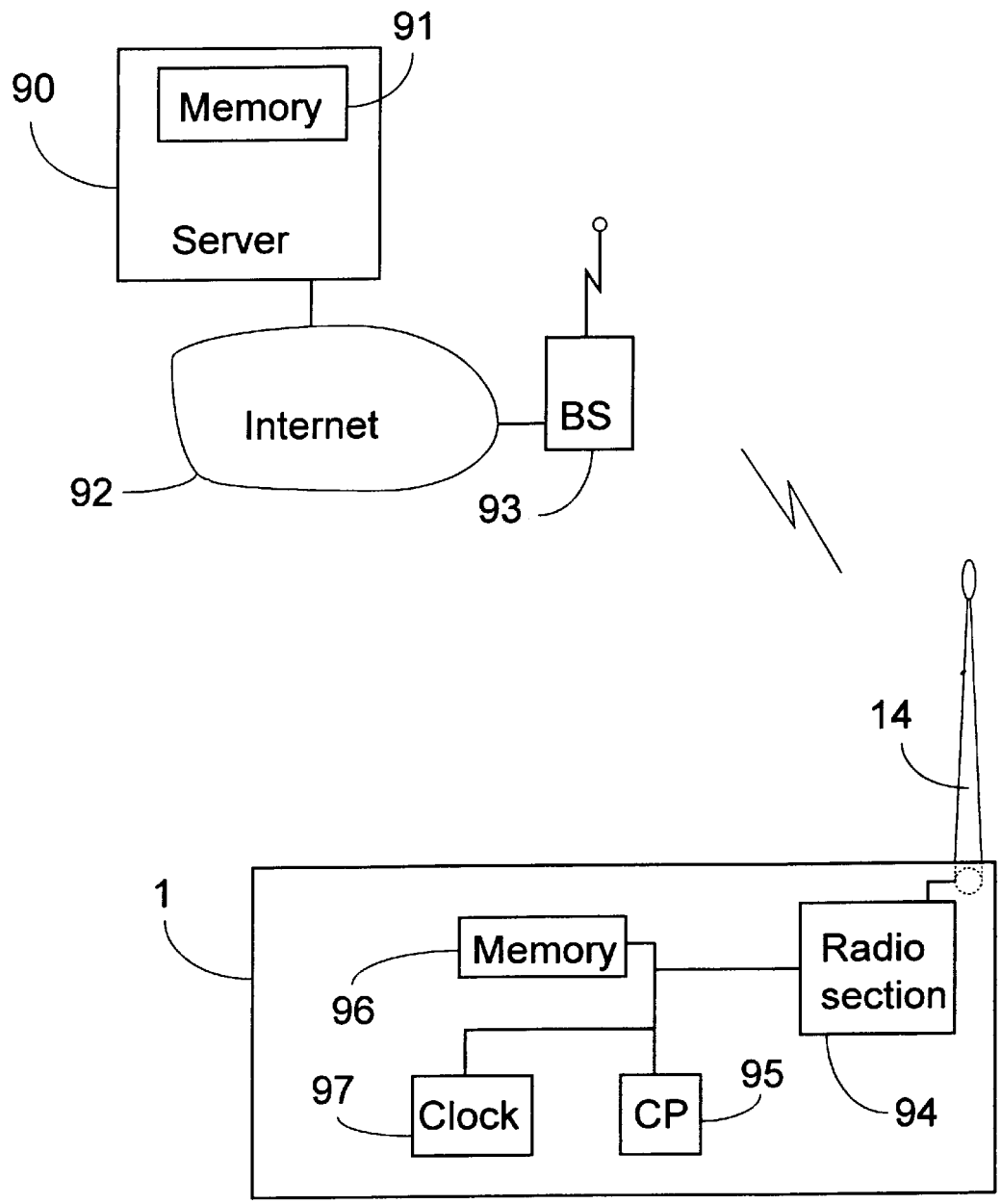
FIG. 11 presents components of the terminal device, telecommunication network and server.

Contact level 30 is the first level entered when the user activates the WWW service. Terminal device 1 displays in display 15 scroll list 31 (FIG. 5), in which the contact information saved by the user himself is displayed, e.g. the WWW services most used by him or otherwise most interesting. The Internet address, called URL (Uniform Resource Locator), is displayed in address field 32. The user selects the contact he wishes by scrolling the contacts using scroll keys 16, whereupon contact information rolls up and down in display scroll list 31, and address field 32 (FIG. 5) is updated with the corresponding new Internet address. Deviating from typical WWW browsers, the three level WWW browser according to the invention does not yet at this stage initiate a data connection to Internet server 90 (FIG. 11), whereupon preferably unnecessary power consumption is avoided, because radio transmitter and receiver 94 need not yet be activated. Also call charges are avoided. Said contact level 30 and the contact list provided by it offer the user a clear starting level to WWW services.

Figure 6:
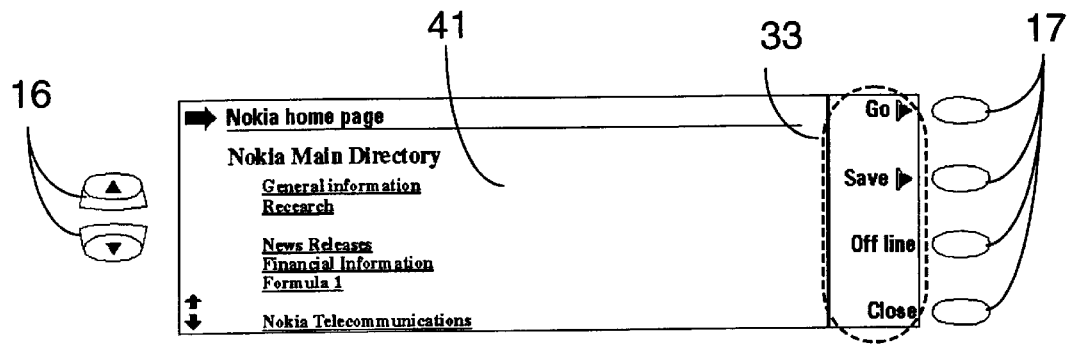
FIG. 6 presents the second interface of a WWW browser employing a three-level user interface according to the invention, the document level.
Figure 7:
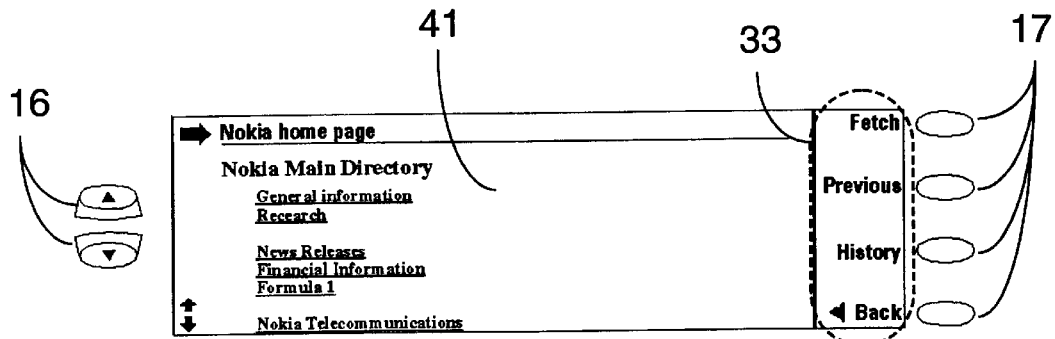
FIG. 7 presents the third interface of a WWW browser employing a three-level user interface according to the invention, the navigation level.
Figure 8:
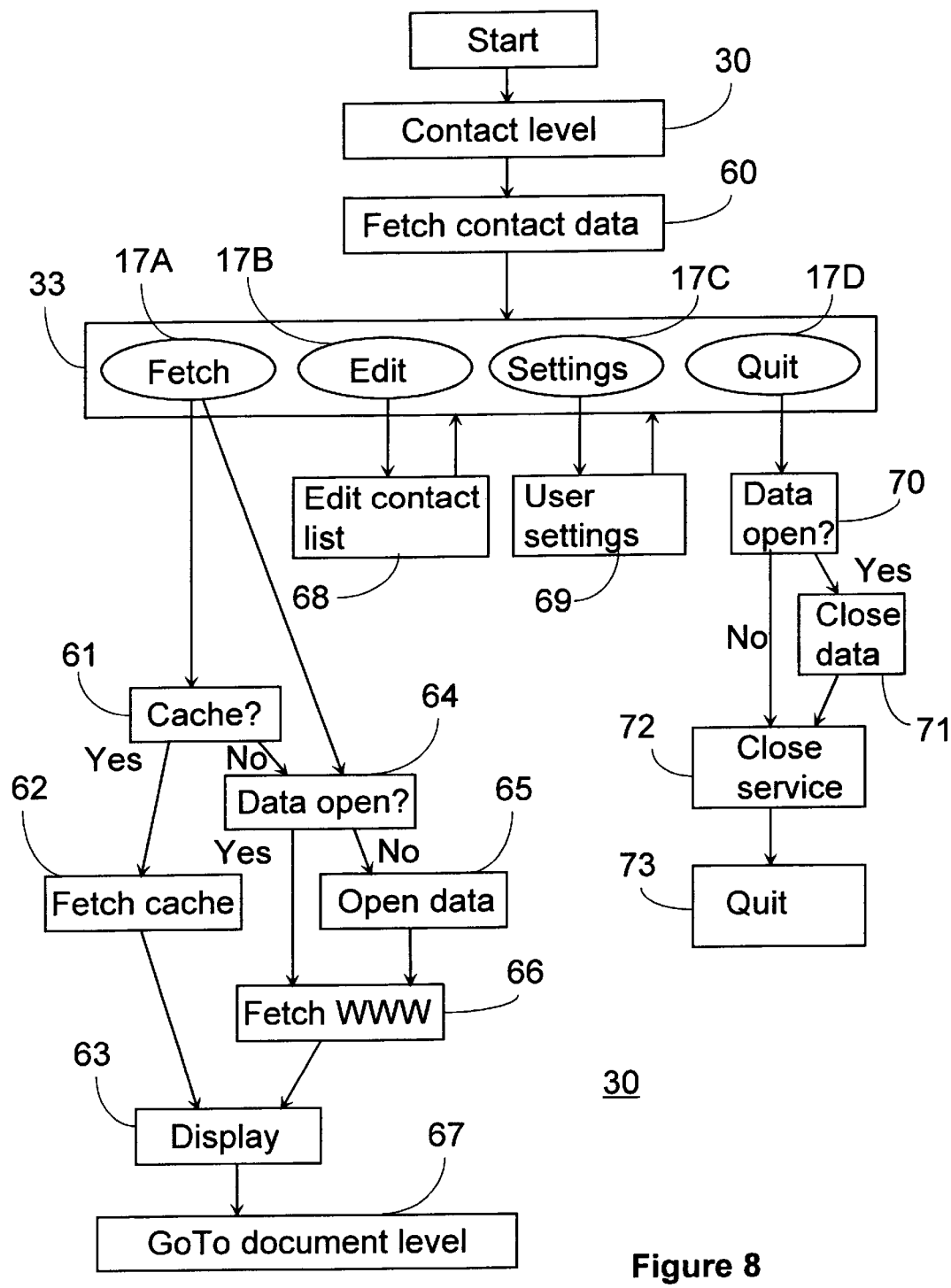
FIG. 8 presents the logical structure of the contact level presented in FIG. 5.

If the user wants to fetch the WWW page of the contact selected with scroll keys 16 to display field 41 (FIGS. 6 and 7), he presses function key 17A (Fetch) (FIG. 8). Alternatively the user can type any Internet address in address field 32, or edit an Internet Address already present in address field 32. When function key 17A (Fetch) is pressed, processor 95 (FIG. 11) of terminal device 1 executes program function block 61 to 66 in order to fetch the information from either memory 96, or utilizing Internet service 92 from the Internet address indicated in address field 32 (FIG. 5). If the required WWW page is stored in memory 96 of terminal device 1, data connection from terminal device 1 to base station server 93 preferably need not be opened and unnecessary power consumption is avoided, which is very useful in battery powered terminal devices 1. Said function block 61 to 66 is common to all three logical levels.

Figure 9:
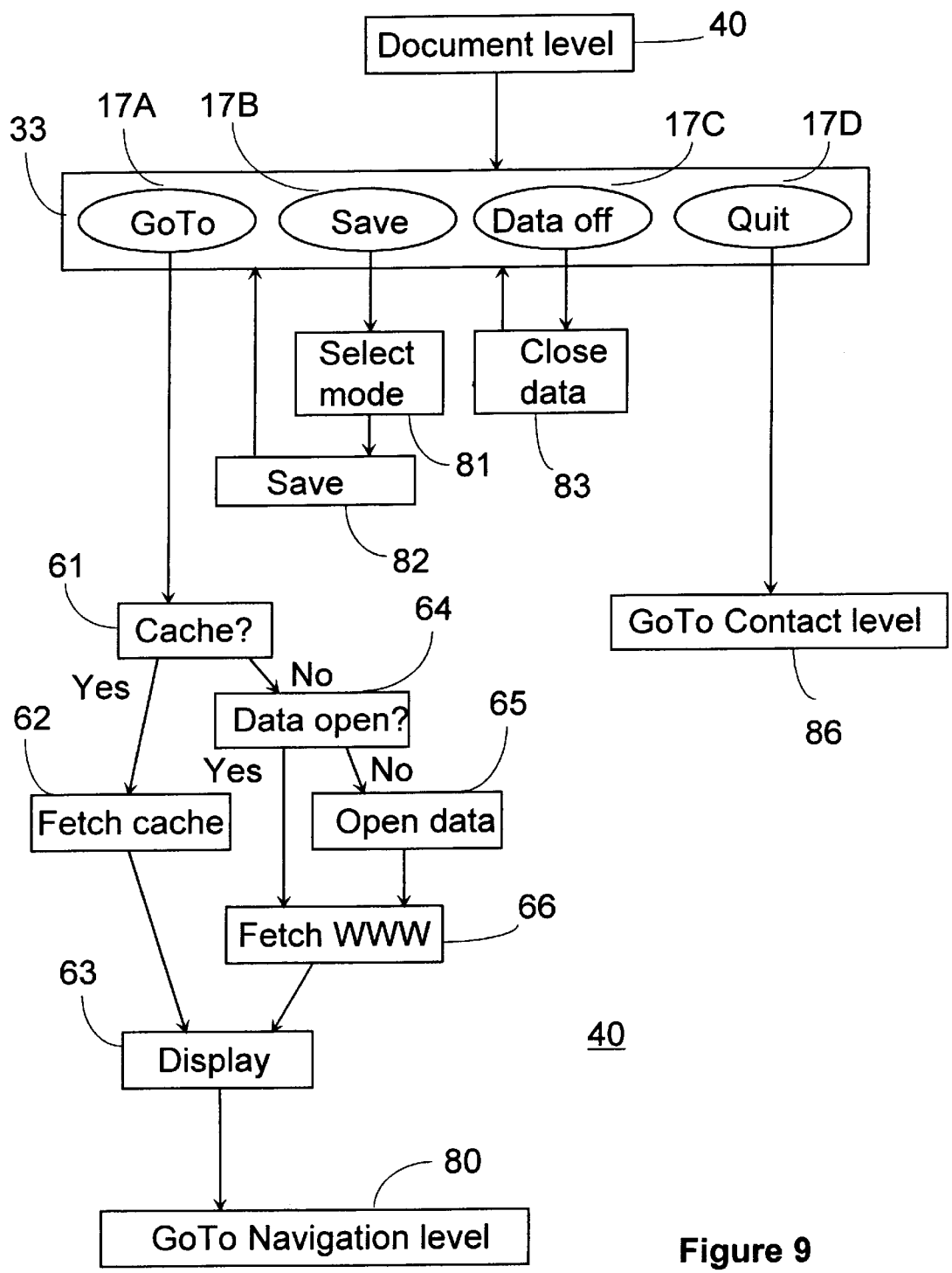
FIG. 9 presents the logical structure of the document level presented in FIG. 6.

When the user has selected the data retrieving process by pressing function key 17A, a routine is started for searching the required information. The information retrieval process is similar for its function in the different logical levels, although the designation, describing the function of the key to the user, may be different. For example, when moving from contact level 30 to document level 40, the designation "Fetch" (FIG. 8, 17A) describes well a situation, in which information is retrieved from an existing list, e.g. a contact list (Hotlist). Meanwhile, when moving from document level 40 to navigation level 50, the user moves in the logical sense from terminal device 1 to Internet 92, when a more descriptive designation is "GoTo" (FIG. 9, 17A).

Figure 10:
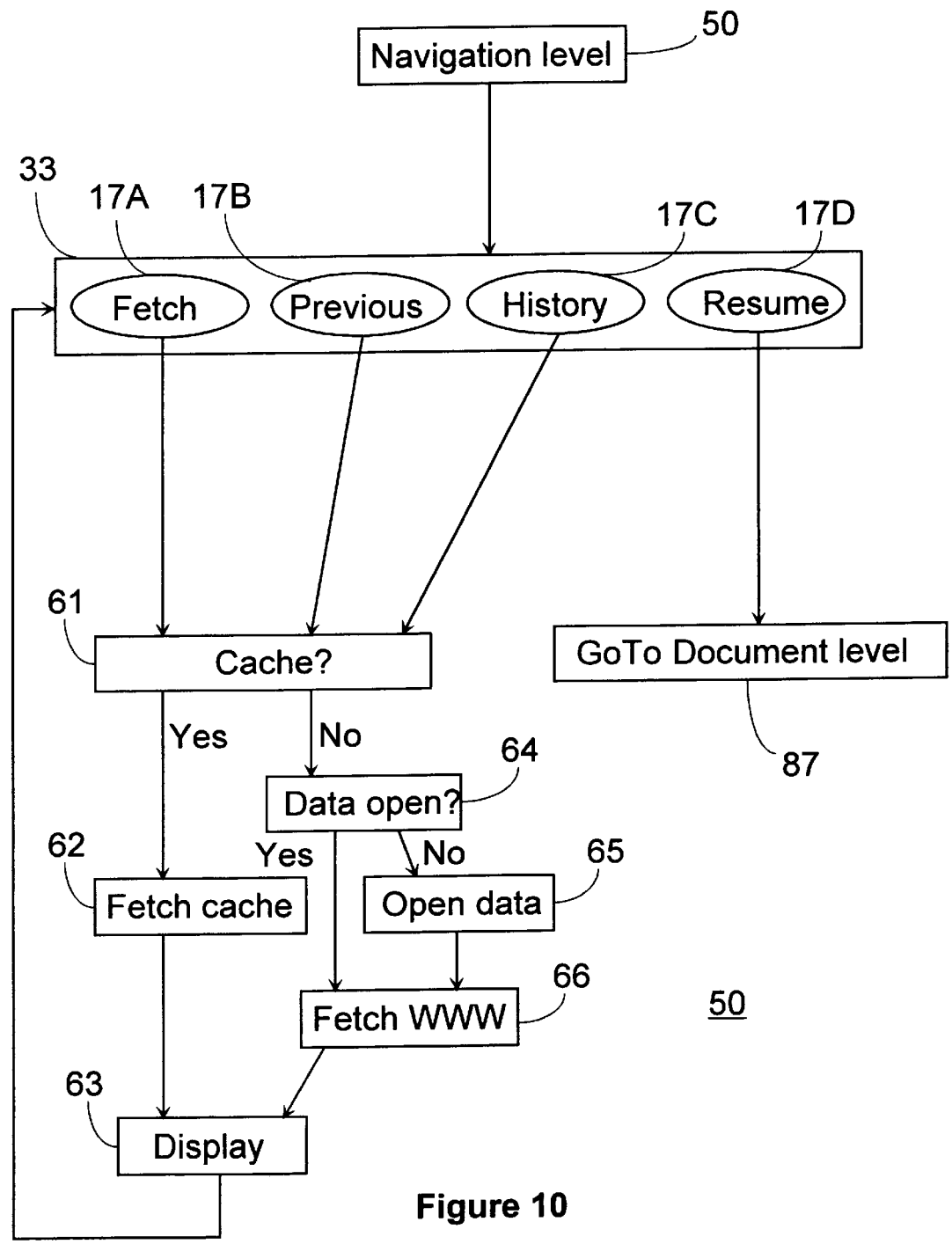
FIG. 10 presents the logical structure of the contact level presented in FIG. 7.

In order to ensure the fastest possible operation of the WWW browser in block Cache? 61 (FIGS. 8 to 10), the required WWW page is first searched in memory 96 of terminal device 1. Within HTTP (HyperText Transfer Protocol) standard the user is reserved the possibility to bypass data search in memory 96, whence data search is started directly in item Data open? 64. Said memory 96 can comprise memory suited for short term data storage, e.g. DRAM (Dynamic Random Access Memory), or memory suited for long term data storage, e.g. so called flash-memory. It is also possible to use as memory e.g. a hard disc known from computers. If the requires information is found in said memory 96, the retrieved information is transferred to display field 41 (FIG. 6) using routines Fetch cache 62 and Display 63. If the required information is not found in memory 96 of terminal device 1, a contact must be taken with Internet 92 and further with server 90, in memory 91 of which the information is found. In block Data open? 64 it is checked whether terminal device 1 has a connection with base station server 93 and whether the data channel between base station server 93 and terminal device 1 is ready for use. If this is not the case, terminal device 1 calls base station server 93 by radio, utilizing radio block 94, and opens the data connection to the Internet service indicated in address fields 32, according to block 65. In the next stage block Fetch WWW 66 transfers the required WWW page to display area 41 (FIG. 6) employing routine Display 63. When the required WWW page has been fetched to display area 41, either from terminal device 1 memory 96 or from server 90 on contact level 30, the WWW browser goes to another logical level, document level 40, according to block Move to document level 67.

If the user did not select the information fetching service by pressing key 17A (Fetch), he can utilize other services in contact level 30. Such services are editing the user's own contact information, that is the information displayed in scroll list 31, according to block Edit contact list 68, by pressing function key 17B (Edit), and modifying user settings according to block User settings 69 by pressing function key 17C (Settings). As the most important user settings can be regarded the selection of IAP (Internet Access Point), which IAP comprises information upon e.g. the telephone numbers which are called in order to contact servers 90 of Internet 92, and setting the parameters employed at establishing a connection, e.g. Proxy-settings which make utilizing local networks faster. Proxy-settings are used for speeding up data transfer through firewalls improving data security. Proxy-settings and firewall are solutions used in Internet 92, prior known to a person skilled in the art.

Particularly important for the WWW browser according to the invention is the parameter which is employed for closing the data connection in a situation in which data is no longer transferred from Internet 92. Controlled by the terminal device processor, when a certain criterium is met, processor 95 closes the data connection. The user can set the time parameter, after which delay terminal device 1 closes the data connection to base station server 93, the time being counted from the moment when data was last transferred in the Internet connection. The countdown is executed by clock 97. By selecting this parameter correctly significant savings are preferably achieved in current consumption and call cost, because data connection is closed automatically always when virtual data connection with the Internet server is not needed. This also increases the terminal device operating time and accordingly the terminal device need not be charged so often.

The adjustment of said time parameter can also be set to be automatic, when it is adapted on each user level according to the actual user need. For example, when the user searches for information often, it is useful to increase the value of the time parameter because the time for connection establishing is the most time consuming process in information search by radio. Again, if the user searches for information relatively seldom, it is useful to decrease the time parameter value in order to save current. If terminal device 1 is provided with equipment for determining data transfer costs, the time parameter can also be weighed according to cost in such a way that the more expensive the connection is, the lower is the time parameter value. Processor 95 of terminal device 1 measures the quantity and transmission density of data packages transferred through the data connection, based upon which processor 95 adjusts the time parameter controlled by user settings. If the user applies adaptive time parameter setting, that is the processor of terminal device 1 adapts the time parameter according to current traffic situation, adjusting the time parameter is typically done between two limits. If the user has set it so in the settings, the terminal device informs the user through display 15 before closing the data connection, allowing the user to decide whether he wants to maintain the data connection or not. If the user does not respond to the inquiry, the data connection is closed in order to save current and call cost. The user can also utilize settings for preventing the closing of data connection in the middle of a service, whereupon utilizing Internet services becomes quicker at the expense of increased call cost.

If the user wishes to quit utilizing a WWW service, he does it on contact level 30 by pressing function key 17D (Close), when, based upon the information given by block Data open? 70, block Close data 71 closes the data connection with base station server 93, if it still exists. After this Close service 72 quits executing the three level WWW browser program, and according to parameters set by the user, block 73 (End), terminal device 1 moves to executing the user selected default service, or resumes the previous active service.

From document level 40 the user can go to navigation level 50 by pressing function key 17A (GoTo) and proceed to utilizing Internet services, or continue data processing on document level 40. On document level 40 the user is in logical sense in terminal device 1 processing existing information. This information, typically a WWW page in display field 41, can be postedited by the user. The user can choose, e.g. whether he wants to store the information permanently in terminal device memory 96. If he does this by pressing function key 17B (Save), the user has in block Select mode 81 a selection of three modes, each of which is suited for its own purpose. The information can be saved in the form the user sees it in display field 41, when information in text format is still available for other services, and it can for example be transmitted as a telefax message or by electronic mail. If the user wants to browse said WWW page also in the future, the text information must be provided HTML (HypeText Markup Language) markup, prior known to a person skilled in the art, in order to enable the WWW browser to handle the text in a correct way. A WWW page comprises in HTML text form certain marks, based upon which the WWW browser can e.g. distinguish links, headlines and normal text information. The third saving alternative is saving the link address in scroll list 31, allowing the user conveniently to search the address already on contact level 30 when he uses WWW service for next time.

On document level 40 the user can minimize the data connection cost and disconnect the data connection by pressing function key 17C (Data off), when the terminal device closes the data connection preferably already before the time parameter, connected with predetermined time, amount of information transferred in data way, or data package transfer density, closes the connection. It is advisable to act like this at once in order to save current, if the user knows that he will not in a while need any new information from servers 90 of Internet 92. If the user no longer needs the services offered by document level 40, he can return to contact level 30 by pressing function key 17D (Close), when block GoTo document level 86 executes the return to contact level 30.

On navigation level 50 the user can freely utilize the services offered by Internet 92 and the numerous links offered by it. Upon going to navigation level 50 the user moves in the logical sense into Internet 92, in which he can freely move from one service to another, search for information using search keys, or even utilize bank services. Moving between services offered by Internet is by a person skilled in the art called surfing. Navigation level 50 provides three preferable methods for searching information. It is either searched directly by link address, by going to the previous active WWW page using a Hotkey, or based upon a list automatically saved by the terminal device, which said list comprises information upon the latest Internet addresses visited by the user. These search criteria are selected using function keys 17A (Fetch), 17B (Previous) and 17C (History). Using function key 17D return to document level 40 is executed according to block GoTo document level 87.

The function of function keys 17 has been described above referring to texts displayed in function key field 33, but the functions of the function keys can also be indicated using graphic symbols, e.g. icons prior known from computers, or combinations of graphics and text.

The above is a description of the realization of the invention and some embodiments utilizing examples. It is self evident to a person skilled in the art that the invention is not limited to the details of the above presented examples and that the invention can be realized also in other embodiments without deviating from the characteristics of the invention. The presented embodiments should be regarded as illustrating but not limiting. Thus the possibilities to realize and use the invention are limited only by the enclosed claims. Thus different embodiments of the invention specified by the claims, also equivalent embodiments, are included in the scope of the invention.

What is claimed is:

1. A terminal device, comprising:
   means for connecting said terminal device with a telecommunication network;
   means for transferring data between said terminal device and said telecommunication network;
   means for measuring the amount of data transfered over a period of time as represented by the number of data packages and/or the data package transfer frequency; and
   means for measuring time from the last data transfer,
   means for setting a predetermined period of time and closing the data connection to said telecommunication network when said predetermined period of time elapses, and
   means for adjusting said set predetermined period of time as a function of said number of data packages or said data transfer frequency.

2. A terminal device according to claim 1 and further comprising means for determining the costs caused by data transfer between said terminal device and said telecommunication network, wherein said terminal device is further arranged to adjust automatically the value of said predetermined period of time, as a function of the determined cost caused by data transfer between the terminal device and said telecommunication network.

3. A terminal device according to claim 1, wherein before said data connection is closed, said terminal device informs the user of said pending closure.

4. A terminal device according to claim 1 and further comprising a user interface functionally divided into at least two levels, a first level and a second level, of which said first level executes part of the tasks required for transferring data between said terminal device and said telecommunication network and said second level carries out at least a portion of the remaining part of the tasks required for transferring data between said terminal device and said telecommunication network.

5. A terminal device according to claim 4, wherein said telecommunication network comprises memory, wherein said terminal device comprises memory, and wherein on said first level information is processed which is stored in said terminal device memory and on said second level information is processed which is stored in said memory of the telecommunication network.

6. A terminal device for establishing a data connection within a telecommunication network, for transferring data between said terminal device and said telecommunication network, as described in claim 1, wherein the data transfer parameter used is the number of data packages transmitted.

7. A terminal device for establishing a data connection within a telecommunication network, for transferring data between said terminal device and said telecommunication network, as described in claim 1, wherein the data transfer parameter used is the cost of said data transfer and said second time period is adjusted inversely with respect to said cost.

8. A terminal device for establishing a data connection within a telecommunication network, for transferring data between said terminal device and said telecommunication network, as described in claim 1, wherein the data transfer parameter used is the density of data package transfer.

9. A terminal device for establishing a data connection within a telecommunication network, for transferring data between said terminal device and said telecommunication network comprising:

a processor for measuring parameters indicative of the transfer of data;

a clock for timing a period from the last transfer of data of time from the last transfer of data;

a user interface for setting a predetermined period of time;

wherein said processor also compares said period of time from the last transfer of data with said set predetermined period of time and closes said data connection when the period from the last transfer of data exceeds said set predetermined period; and wherein said processor adjusts said set predetermined period of time as a function of said data transfer parameters.

10. In a terminal device for establishing a data connection within a telecommunication network, for transferring data between said terminal device and said telecommunication network, a method of conserving connection time comprising the steps of:

measuring parameters indicative of the transfer of data;

timing the period of time expired from the last transfer of data;

setting a predetermined period of time in which to close the connection, if no data transmission occurs;

comparing said period of time from the last transfer of data with said set predetermined period of time and closing said data connection when said period of time from the last transfer of data exceeds said set predetermined period; and adjusting said set predetermined period of time as a function of said quantity and density of data transmissions.

11. In a terminal device for establishing a data connection within a telecommunication network, for transferring data between said terminal device and said telecommunication network, a method of conserving connection time, as described in claim 10, wherein the step of monitoring comprises measuring the number of data packages transmitted.

12. In a terminal device for establishing a data connection within a telecommunication network, for transferring data between said terminal device and said telecommunication network, a method of conserving connection time, as described in claim 10, wherein the step of monitoring comprises monitoring the cost of said data transfer and said second time period is adjusted inversely with respect to said cost.

13. In a terminal device for establishing a data connection within a telecommunication network, for transferring data between said terminal device and said telecommunication network, a method of conserving connection time, as described in claim 10, wherein the step of measuring comprises measuring the density of data package transfer.

* * * * *